United States Patent [19]

Huff et al.

[11] 4,338,116
[45] Jul. 6, 1982

[54] APPARATUS AND METHOD FOR REDUCING MECHANICAL DEAD TIMES IN THE OPERATION OF A GLASSWARE FORMING MACHINE

[75] Inventors: Norman T. Huff; Donivan M. Shetterly, both of Toledo, Ohio; Lawrence I. Kalisher, San Diego, Calif.

[73] Assignee: Owens-Illinois, Inc., Toledo, Ohio

[21] Appl. No.: 241,823

[22] Filed: Mar. 9, 1981

[51] Int. Cl.³ .............................................. C03B 9/40
[52] U.S. Cl. ........................................ 65/29; 65/158; 65/163; 65/164; 364/473; 364/476
[58] Field of Search .................. 65/29, 158, 159, 163, 65/164, DIG. 13; 364/473, 476

[56] References Cited

U.S. PATENT DOCUMENTS

| 3,877,915 | 4/1975 | Mylchreest | 65/163 X |
| 3,905,793 | 9/1975 | Croughwell | 65/163 |
| 4,007,028 | 2/1977 | Bublitz et al. | 65/163 |
| 4,108,623 | 8/1978 | Cárdenas-Franco | 65/158 X |
| 4,152,134 | 5/1979 | Dowling et al. | 65/29 X |
| 4,162,909 | 7/1979 | Peters | 65/29 X |
| 4,247,317 | 1/1981 | Wood et al. | 65/163 X |

FOREIGN PATENT DOCUMENTS 2108894 5/1972 France ................................ 65/29

Primary Examiner—Arthur D. Kellogg
Attorney, Agent, or Firm—Gerald T. Welch; Myron E. Click; David H. Wilson

[57] ABSTRACT

An electronic control system for an automatic glassware forming machine includes a plurality of position sensors for monitoring the motions of individual glassware forming mechanisms. The sensors generate output signals which define the start and stop times and/or motion of the respective forming mechanisms. The electronic control is responsive to the sensor output signals for identifying any mechanical dead times in the forming cycle. Mechanical dead time is defined as time during which no machine motions are occurring, but could be occurring without interfering with essential heat transfer functions. The electronic control can then reduce or remove selected mechanical dead times to reduce the machine cycle length, and consequently, increase the production rate of the machine.

21 Claims, 9 Drawing Figures

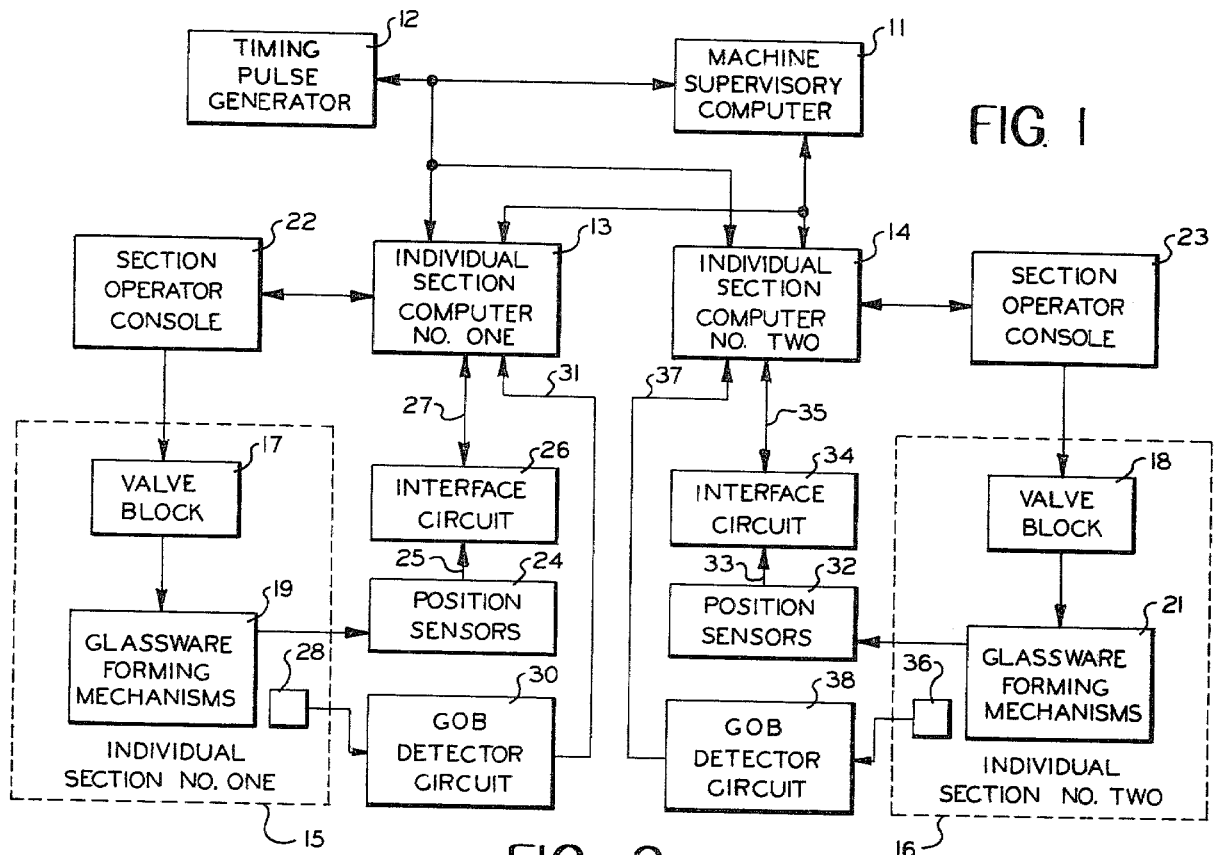
FIG. 1
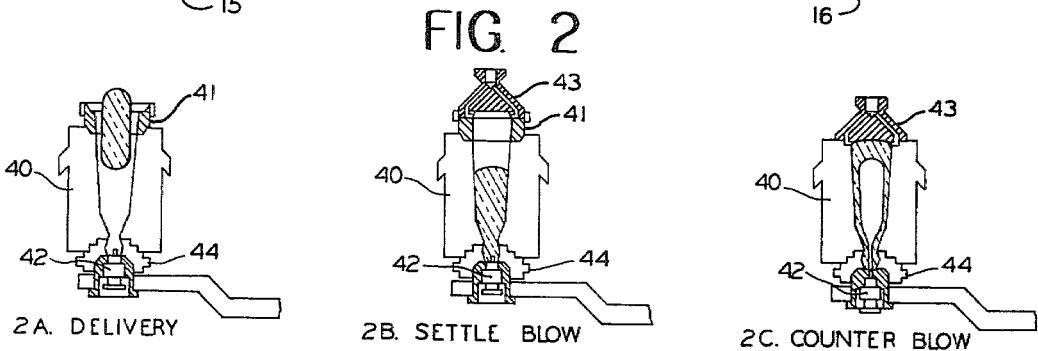
2A. DELIVERY  2B. SETTLE BLOW  2C. COUNTER BLOW
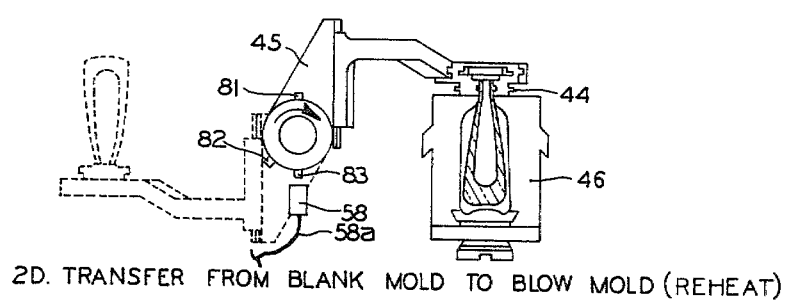
2D. TRANSFER FROM BLANK MOLD TO BLOW MOLD (REHEAT)
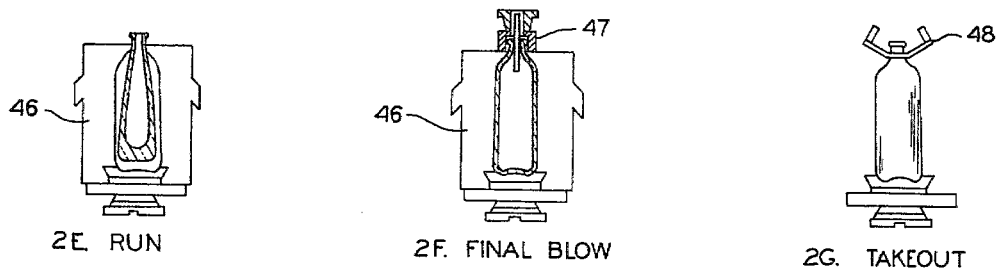
2E. RUN  2F. FINAL BLOW  2G. TAKEOUT

APPARATUS AND METHOD FOR REDUCING MECHANICAL DEAD TIMES IN THE OPERATION OF A GLASSWARE FORMING MACHINE

BACKGROUND OF THE INVENTION

1. Field of the Invention

The present invention relates generally to control systems for glassware forming machines and in particular to electronically controlled individual section glassware forming machines.

2. Description of the Prior Art

The individual section or IS glassware forming machine is well known and includes a plurality of sections each having means for forming glassware articles in a timed, predetermined sequence of steps. Typically, the sections are fed from a single source of molten glass which forms gobs of molten glass for distribution to the individual sections in an ordered sequence. The sections are operated in synchronism at a relative phase difference such that one section is receiving a gob, while another section is delivering a finished glassware article to a conveyor, and one or more other sections are performing various ones of the intermediate forming steps.

The forming means in each section are typically operated from pneumatic motors or actuators. In early prior art machines, the pneumatic motors were controlled by a valve block which in turn was controlled by a timing drum for each section driven from a line shaft which synchronized all parts of the machine. One of the limitations of the timing drum was the difficulty of manually adjusting the timing during the operation of the machine.

One solution to this problem was to replace all the timing drums with an electronic control means. Various types of electronic control systems for glassware forming machines have been developed. Once such control system is disclosed in U.S. Pat. No. 4,152,134 issued to Dowling et al. An electronic control means of the type disclosed in the above-mentioned patent permits timing changes to be effected electronically so that the adjustments are easier to perform and the accuracy of the adjustments is greatly increased over the prior art controls.

SUMMARY OF THE INVENTION

The present invention relates to an electronic control system for a glassware forming machine which includes means for identifying and, if desired, reducing any mechanical dead time (MDT) associated with the glassware forming mechanisms. Mechanical dead time is defined as time during which no machine motions are occurring but could be occurring without interfering with essential heat transfer operations. A heat transfer operation includes an operation where heat is being removed from the glass. Reducing mechanical dead time results in a reduced length machine cycle and, consequently, an increased production rate.

In accordance with the present invention, each individual section includes a plurality of position sensors coupled to monitor the motions of selected glassware forming mechanisms. The position sensors generate output signals which define the motion times of the respective forming mechanisms. In the preferred embodiment of the invention, the sensor output signals are supplied to an individual section computer which identifies and calculates the duration of any existing MDT's. The computer can then reduce or remove selected MDT's by generating a new set of timing data for actuating the glassware forming mechanisms. Thus, the machine cycle time is reduced while the bottle forming cycle time (blank, reheat, run, mold times) remains constant such that there is an improvement or no change in the quality of the bottle.

It is an object of the present invention to provide a control system for increasing the speed of an individual section glassware forming machine.

It is another object of the present invention to provide an apparatus and a method for reducing the mechanical dead times in the machine cycle of an individual section glassware forming machine.

It is a further object of the present invention to provide an apparatus and a method for increasing the efficiency of an individual section glassware forming machine.

BRIEF DESCRIPTION OF THE DRAWINGS

FIG. 1 is a block diagram of a two section IS machine having an electronic control system according to the present invention;

FIGS. 2A through 2G are schematic diagrams of the sequence of forming steps in one section of an IS machine;

DESCRIPTION OF THE PREFERRED EMBODIMENT

Figure 3:
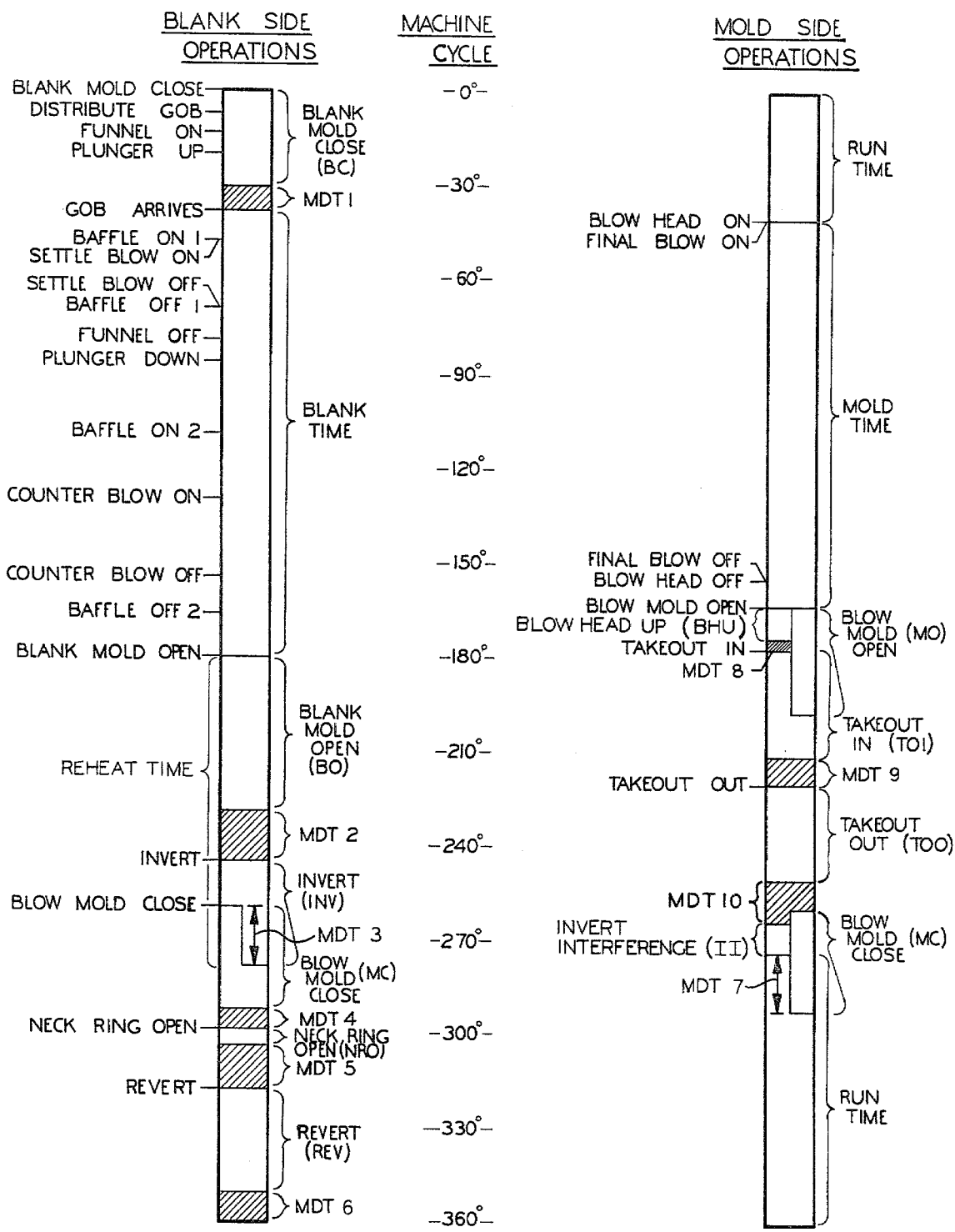
FIG. 3 is a timing diagram which indicates the sequence and the relative timing positions at which the various glassware forming functions are performed in a machine cycle.

There is shown in FIG. 1 a block diagram of an individual section glassware forming machine to which the present invention is applicable. Although a brief description appears herein, a more detailed description of this type of glassware forming machine can be found in U.S. Pat. No. 4,152,143 in the names of W. Thomas Dowling and Daniel S. Farkas, and assigned to the assignee of the present invention.

A machine supervisory computer 11 receives a train of timing pulses from a timing pulse generator 12 to establish the timing for the machine cycle. The machine supervisory computer 11 is connected to a pair of individual section computers 13 and 14 which are respectively connected to an individual section No. One 15 and an individual section No. Two 16. The individual sections 15 and 16 respectively include valve blocks 17 and 18 and a plurality of glassware forming mechanisms 19 and 21.

The individual sections 15 and 16 each receive gobs of molten glass from a gob distributor (not shown). The gob distributor supplies the gobs to the individual sections at a predetermined rate proportional to the speed of the gob distributor drive motor (not shown). The speed of this drive motor is determined by the frequency of the alternating current power generated by a power source such as an inverter drive (not shown).

Initially, the machine supervisory computer 11 loads the individual section computers 13 and 14 with control programs and timing data for controlling the associated individual sections. Thereafter, the individual section computers 13 and 14 control the glassware forming cycles of the associated individual section by generating control signals through section operator consoles (SOC) 22 and 23 respectively to the respective valve blocks. The control signals are generated in response to the execution of the control program and the timing pulses from the timing pulse generator 12.

The timing pulse generator 12 generates a clock signal to the machine supervisory computer 11 and the individual section computers 13 and 14 which signal provides a reference for timing the machine cycle and the sequence of steps to be performed by the individual section computers. Typically, machine timing is expressed in degrees and a machine cycle is 360° in length. Thus, 360 clock pulses or some multiple thereof comprise one machine cycle. The cycle for each individual section is also 360°, but the cycles for the sections will be offset from the start of the machine cycle by a different number of degrees to compensate for the difference of the gob delivery time to each section. The timing pulse generator 12 also generates a reset pulse after generating the clock pulses representing one cycle, which reset pulse is utilized by the machine supervisory computer 11 and the individual section computers 13 and 14 to define the end and beginning of the successive machine cycles. One type of timing pulse generator which can be used is disclosed in U.S. Pat. No. 4,145,204 in the names of Daniel Farkas and Philip D. Perry, which is assigned to the assignee of the present invention. The timing pulse generator 12 can also be of the shaft encoder type. In either case, the rate of distribution of the gobs is synchronized with the clock signal generated by the timing pulse generator.

The valve blocks 17 and 18 are connected to control the glassware forming mechanisms, 19 and 21 respectively, in a predetermined, timed sequence of steps to form the articles of glassware. The valves of the valve blocks 17 and 18 are actuated by solenoids (not shown) which are controlled by the respective individual section computers in accordance with the control programs and timing data supplied by the machine supervisory computer 11.

The pair of section operator consoles (SOC's) 22 and 23 are connected to the individual section computers 13 and 14, respectively, and to the valve blocks 17 and 18, respectively. The consoles 22 and 23 are used to make adjustments to the mechanism timing. For example, the actuation of a particular valve may be either advanced or retarded by the operator with the use of the console. The consoles 22 and 23 can also be utilized to communicate with the individual section computers and to control the operating condition of the respective individual section.

In accordance with the present invention, a plurality of position sensors 24 are associated with the various glassware forming mechanisms 19 to sense the relative positions of the forming mechanisms. The sensors 24 generate a plurality of signals on lines 25 to an interface circuit 26 which filters the signals and converts them into digital form before supplying the position information to the section computer 13 on lines 27. A gob sensor 28 is located proximate to the gob distributor and senses the time when a gob of glass is delivered to the mold. The signal from the sensor 28 is supplied to a gob detector circuit 30 which generates a gob detection signal on a line 31 to the individual section computer 13 which signal is utilized to adjust the timing of that individual section to the presence of the gob. One type of gob sensor and gob detection circuit which can be utilized is disclosed in U.S. Pat. No. 4,162,909 in the name of Homer F. Peters and assigned to the assignee of the present invention.

The individual section No. Two 16 also includes a plurality of position sensors 32 associated with the glassware forming mechanisms 21. The sensors 32 generate position signals on lines 33 to an interface circuit 34 which supplies the position information to the computer 14 on lines 35. The sensors 32 and the circuit 34 function in a manner similar to the sensors 24 and the circuit 26. A gob sensor 36 and a gob detector circuit 38 are provided to sense the delivery of a gob to the mold of the individual section 16 and generate a gob detection signal on a line 37. As will be discussed, the present invention utilizes the position sensors to sense the motions of glassware forming mechanisms and calculates any mechanical dead time between the mechanisms.

There is shown in FIG. 2 a schematic diagram of a sequence of events of one cycle of an individual section of the glassware forming machine shown in FIG. 1. These steps are illustrative of the method of forming a typical article of glassware known as the blow and blow cycle. There is shown in FIG. 3 a timing diagram in bar graph form of the relative positions in this section cycle at which the control signals for the various glassware forming steps are generated when the section is in the run condition. It will be understood that there is a response time associated with each of the control signals. Furthermore, the timing of these steps depends upon the type of glassware being formed and the steps can be deleted or repeated as necessary. It should also be noted that the present invention is applicable to other types of glassware forming methods, for example, press and blow cycles. Throughout the following discussion of FIGS. 2 and 3, the steps shown in FIG. 3 will be referred to in capital letters such as DISTRIBUTE GOB.

As was previously mentioned, a continuous flow of molten glass is repetitively severed at a predetermined rate to produce a series of molten gobs. A gob distributor (not shown) sequentially delivers one or more separate gobs to each individual section of the machine. As shown in FIG. 3, the distribution (DISTRIBUTE GOB) typically occurs some time after the start of the section cycle at 0°. There is a travel time lapse between the time at which the gob is severed and a time at which the gob arrives at the blank station. As illustrated in the gob delivery step, FIG. 2A, during this travel time a blank mold 40 is moved to its closed postion (BLANK MOLD CLOSE) and a funnel 41 is positioned on top of the mold 40 (FUNNEL ON) in order to guide the gob into the mold. A plunger 42, adjacent the bottom of the mold, is then moved up into position (PLUNGER UP). When the gob arrives (GOB ARRIVES), it falls through the funnel 41 into the interior of the blank mold 40.

In the settle blow step, FIG. 2B, a baffle 43 is positioned on top of the funnel 41 (BAFFLE ON 1). A neck ring 44 is adjacent the bottom of the mold 40 and encloses the plunger 42. When the baffle 43 is in position, air under pressure is momentarily discharged into the top of the mold to force the molten glass into the mold and neck ring, and around the plunger (SETTLE BLOW ON-SETTLE BLOW OFF), and then the baffle is removed (BAFFLE OFF 1).

In the counter blow step, FIG. 2C, the funnel 41 is removed (FUNNEL OFF) and the plunger 42 is retracted (PLUNGER DOWN), leaving a depression in the molten glass. Next, the baffle 43 is positioned on top of the mold (BAFFLE ON 2) and counter blow air under pressure is introduced into the depression (COUNTER BLOW ON) to force the molten glass against the wall of the blank mold to produce a partially formed article of glassware referred to as a parison. The counter blow air is turned off (COUNTER BLOW OFF) and the baffle 43 is removed from the mold (BAFFLE OFF 2).

During the counter blow step, the body of the blank mold extracts sufficient heat from the parison to form a cooled skin thereon which is rigid enough to allow manipulation of the parison. In the invert or transfer from blank mold to blow mold (reheat) step, FIG. 2D, the blank mold is opened (BLANK MOLD OPEN) and a transfer mechanism or invert arm 45 attached to the neck ring 44 rotates the parison 180° (INVERT) into an open blow mold 46. The neck ring portion of the parison which is positioned downward is now in the upward position. As the transfer occurs, the skin of the parison is reheated by the relatively hot interior of the parison and the parison becomes sufficiently soft for a final blowing step. Next, the blow mold 46 is closed (BLOW MOLD CLOSE) and the neck ring 44 is opened (NECK RING OPEN) and removed so that the parison is being supported at its neck portion by the blow mold. In this position, the run step, FIG. 2E, takes place. The invert arm 45 and the neck ring 44 are rotated back to the blow mold (REVERT) for the next parison to be formed.

In the final blow step, FIG. 2F, a blow head 47 is positioned on top of the mold 46 (BLOW HEAD ON). Air under pressure is introduced through the blow head 47 (FINAL BLOW ON) into the interior of the parison to form the parison into the shape desired by the blow mold which is a shape of the desired article of glassware. The blow air remains on while the walls of the blow mold absorb heat from the glass such that the glassware becomes stiff enough for handling. The blow air is then turned off (FINAL BLOW OFF) and the blow head 47 is removed (BLOW HEAD OFF). The blow mold is then opened (BLOW MOLD OPEN) such that the article of glassware is ready to be removed from the section.

In the takeout step, FIG. 2G, a takeout mechanism 48 is moved into position to grasp the article of glassware at its neck portion (TAKEOUT IN). The takeout mechanism 48 then transfers (TAKEOUT OUT) the finished article of glassware to a dead plate (not shown) for further cooling and subsequent push out onto a conveyor (not shown).

As illustrated in FIG. 3, the foregoing machine operation functions are performed in cycles of 360°. The forming process is a two stage process, wherein the first stage is performed in the blank mold station and the second stage is performed at the blow mold station. The respective machine functions are performed in the two stations simultaneously such that, for each machine cycle, a blank mold station will produce a partially formed article of glassware and a blow mold station will produce a finished article of glassware. Thus, when the blow mold station is performing a final blow function on the blank, the blank mold station is producing a partially formed article of glassware to be subsequently transfered to the blow mold station.

As previously mentioned, there is a response time associated with the actuation of the various glassware forming mechanisms. For example, when a control signal is generated to the valve block 17 to close the blank mold, there is a first time delay between the time when the signal is received by the valve block and the time when the blank mold begins to move. There is a second time delay, which is relatively large in comparison with the first time delay, as the blank mold is moved from its completely open position to its completely closed position. Both of these time delays must be taken into account in determining the appropriate time during the machine cycle at which the blank close control signal should be generated.

Several of the glassware forming operations, along with their respective time delays, are illustrated in the timing diagram of FIG. 3 along the right side of each bar graph. For example, when the control signal is generated to close the blank mold, shown at approximately 0° in FIG. 3, the blank mold will begin to close. However, it may take the blank mold thirty or thirty-five degrees of a machine cycle before it is moved to its completely closed position. As shown in FIG. 3, during this time the control signals to position the funnel and move the plunger up are also generated. The particular glassware forming operations shown along the right side of each bar graph of FIG. 3 are utilized to identify mechanical dead times as discussed below. Also, several operations are shown with an abbreviation in parenthesis, such as (BC) for blank mold close, which are referred to below.

The present invention is concerned with the identification and reduction of any mechanical dead time (MDT) which may exist in the machine cycle. As noted above, the mechanical dead time is defined as the time periods during which no machine motions are occurring but could be occurring without interfering with essential heat transfer operations such as blank time and mold time. For example, in FIG. 3, the blank mold must completely close before a gob of glass arrives. However, any time delay between the completion of the closing of the blank mold (BC) and the arrival of the gob is considered mechanical dead time and is shown in FIG. 3 as MTD1. Similarly, in the mold side operations shown in FIG. 3, the blow head must be moved up out of position (BHU) before the takeout mechanism can be moved in (TOI). The mechanical dead time between the time when the blow head is up out of position and the time when the takeout mechanism begins to move is shown in FIG. 3 as MTD8. By removing equal amounts of mechanical dead time from both the blank side and mold side cycles, the machine cycle can be reduced to increase the speed of the machine while the forming cycle time remains constant. A more detailed discussion of the manner in which the dead times are reduced will follow a discussion of the position sensors which are utilized to monitor the positions of the glassware forming mechanisms.

Figure 4:
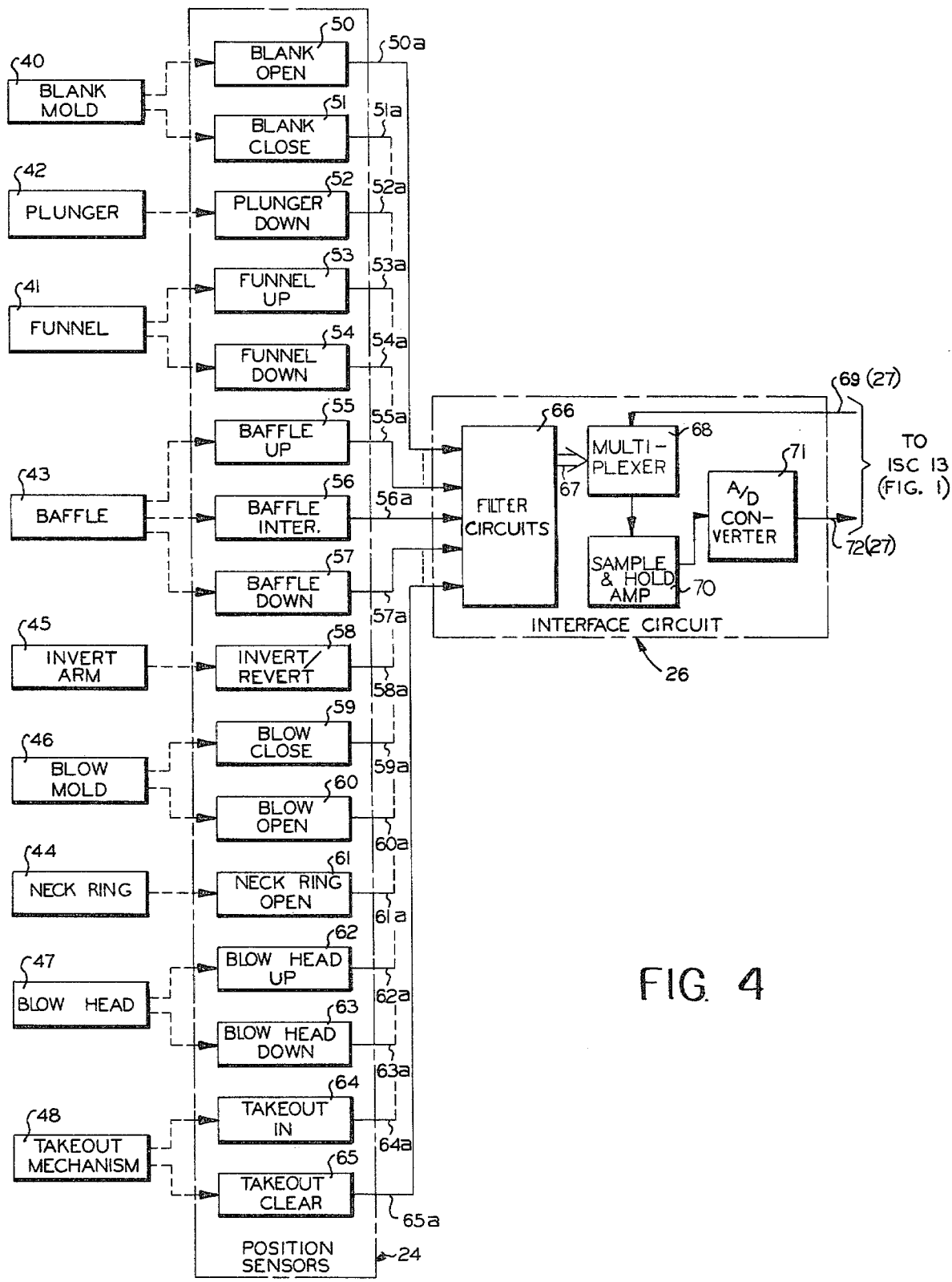
FIG. 4 is a more detailed block diagram of the position sensors and interface circuit of FIG. 1.

There is shown in FIG. 4 a block diagram of the position sensors 24 and the interface circuit 26 shown in FIG. 1. The position sensors 24 include a plurality of individual sensors 50 through 65 which are positioned to sense the motions of glassware forming mechanisms 40 through 48. The couplings between the glassware forming mechanisms and the associated position sensors are represented in FIG. 4 as dashed lines. The output of each of the sensors 50 through 65 is generated on lines 50a through 65a respectively (included in the lines 25 of FIG. 1) and is supplied to a filter circuit 66 included in the interface circuit 26 of FIG. 1. The filtered output signals are then supplied on lines 67 to a multiplexer 68 which receives control signals on lines 69 (a portion of the lines 27 of FIG. 1) from the ISC 13. The multiplexer 68 generates a selected one of the filtered signals on the lines 67 to a sample and hold amplifier 70. The control signals on the lines 69 determine which one of the signals on the lines 67 is supplied the amplifier 70 which in turn generates the signal to an A/D converter 71. The output of the A/D converter is generated on lines 72 (a portion of the lines 27 in FIG. 1) to be read by the individual section computer 13. The position sensors 32 and the interface circuit 34 associated with individual section No. Two 16 are similar to the sensors 24 and the interface circuit 26.

Figure 5:
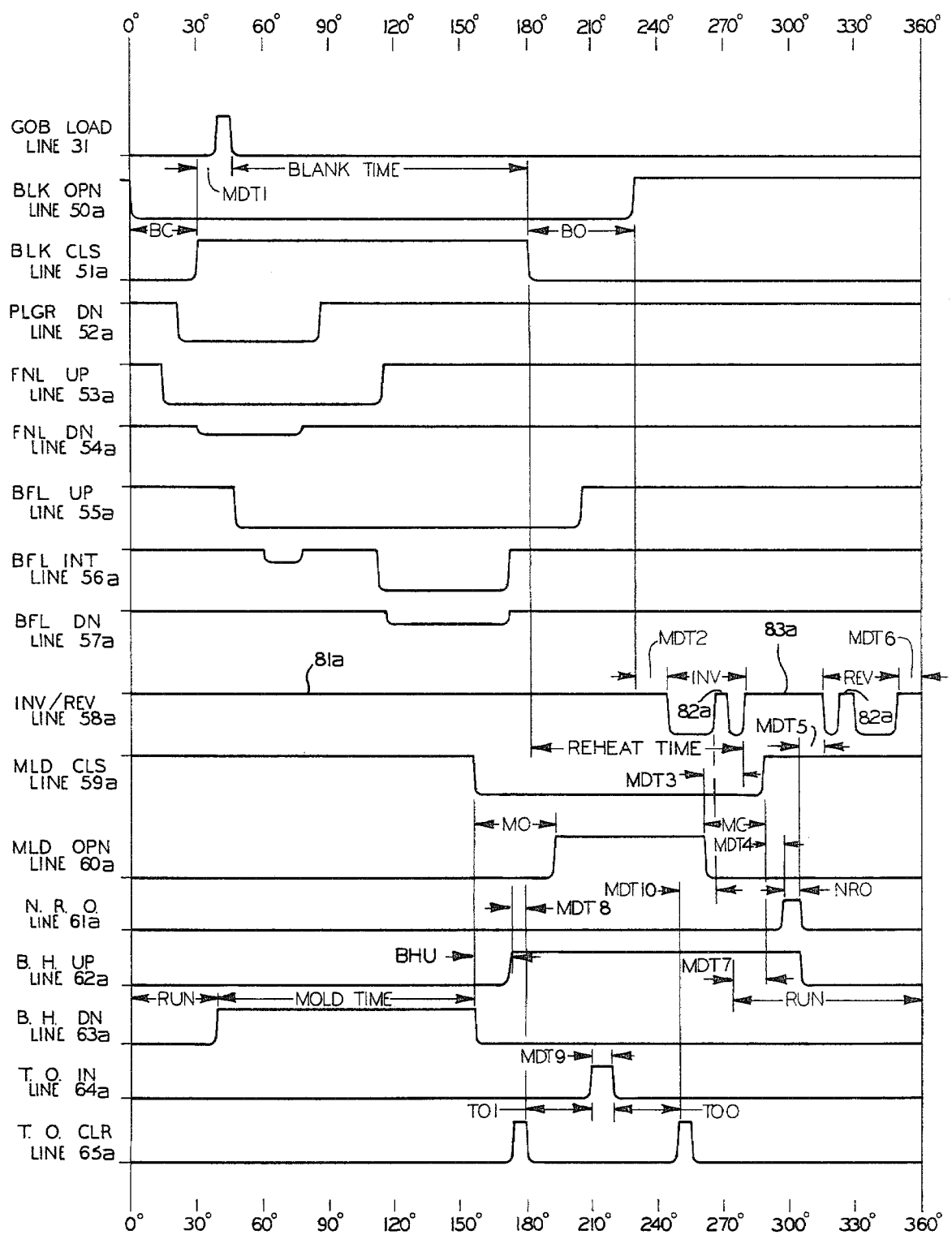
FIG. 5 is a waveform diagram which illustrates the output waveforms generated by the position sensors of FIG. 4 during a machine cycle.

The position sensors 24 can be inductive proximity sensors such as a model no. BI5-GI8-Y0 available from Turck, Inc. There are shown in FIG. 5 examples of waveforms which are generated by the position sensors of FIG. 4 when inductive proximity sensors are used. Also shown in FIG. 5 is the gob load signal generated by the detector circuit 30 when a gob arrives at the blank mold. A inductive proximity sensor functions to generate an output pulse at a predetermined magnitude whenever the sensor is proximate an electrical conductor such as a piece of steel, for example.

An example of how one of the sensors can be positioned to generate a waveform, as shown in FIG. 5, is illustrated in FIG. 2D. In FIG. 2D, the invert/revert sensor 58 is fixed to a suitable support (not shown) adjacent the pivot point of the invert arm 45. A steel pin 81 is fixed to the invert arm such that, when the arm 45 is in its revert position (blank mold side), the pin 81 is adjacent the sensor 58 and the sensor 58 will generate a relatively wide pulse 81a shown in the INV/REV waveform of FIG. 5. Similarly, steel pins 82 and 83 are fixed to the invert arm such that, when the arm is rotated, the output pulses 82a and 83a respectively, shown in the INV/REV waveform, will be generated. The output pulse 83a is generated when the arm 45 is in the invert position, shown in FIG. 2D. The output pulse 82a is generated at an intermediate position and is utilized with the takeout clear signal on the line 65a to ensure that the takeout mechanism has cleared the arm 45 during the invert and revert operations.

The motions of the other glassware forming mechanisms can be monitored in a similar manner. In some instances, more than one proximity sensor may be required to monitor the motions of a single mechanism. For example, in monitoring the opening and closing of the blow mold 46, the sensor 59 is positioned to generate an output signal when the blow mold is in its open position, and the sensor 60 is positioned to generate an output signal when the blow mold is closed. The time periods when neither of the sensors 59 and 60 are generating output signals represent the times when either the mold is opening (MO) or closing (MC). Furthermore, it may be advantageous to obtain position versus time information by utilizing a potentiometer type sensor to generate a continuous output signal for selected mechanisms.

As shown in FIG. 5, the timing data necessary to identify the duration of the MDT1 through MDT10 periods can be determined from the sensor output waveforms. Although certain motions, such as for the funnel and the baffle, are not required to identify MDT's, it is desirous to have such motion information when any timing changes are to be made.

Figure 6A:
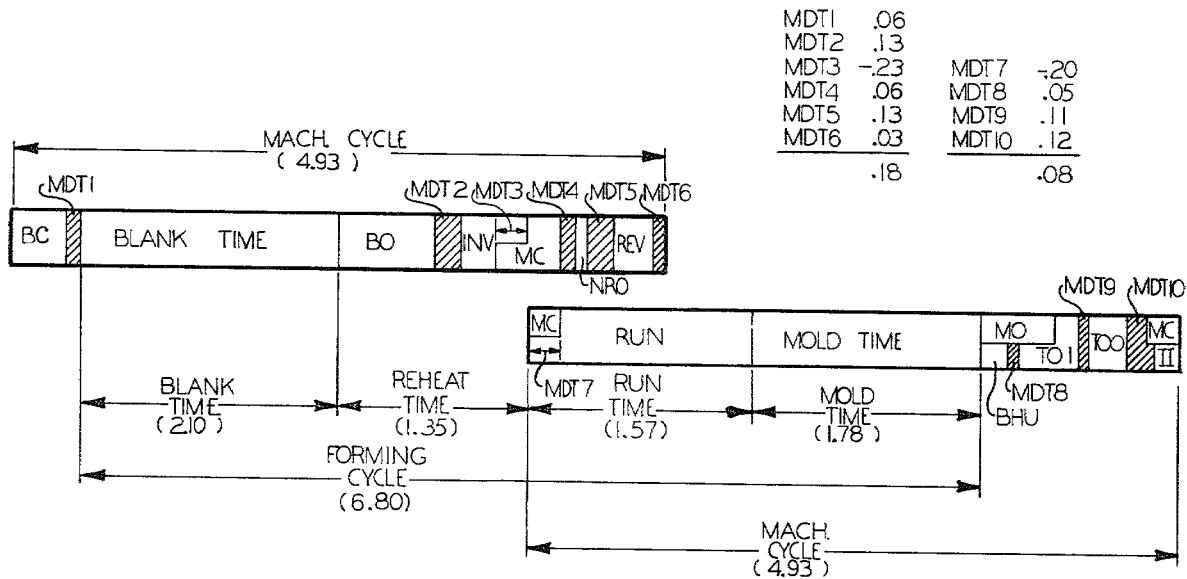
FIGS. 6A and 6B are timing diagrams which illustrate the manner in which mechanical dead time can be reduced in a machine cycle.
Figure 6B:
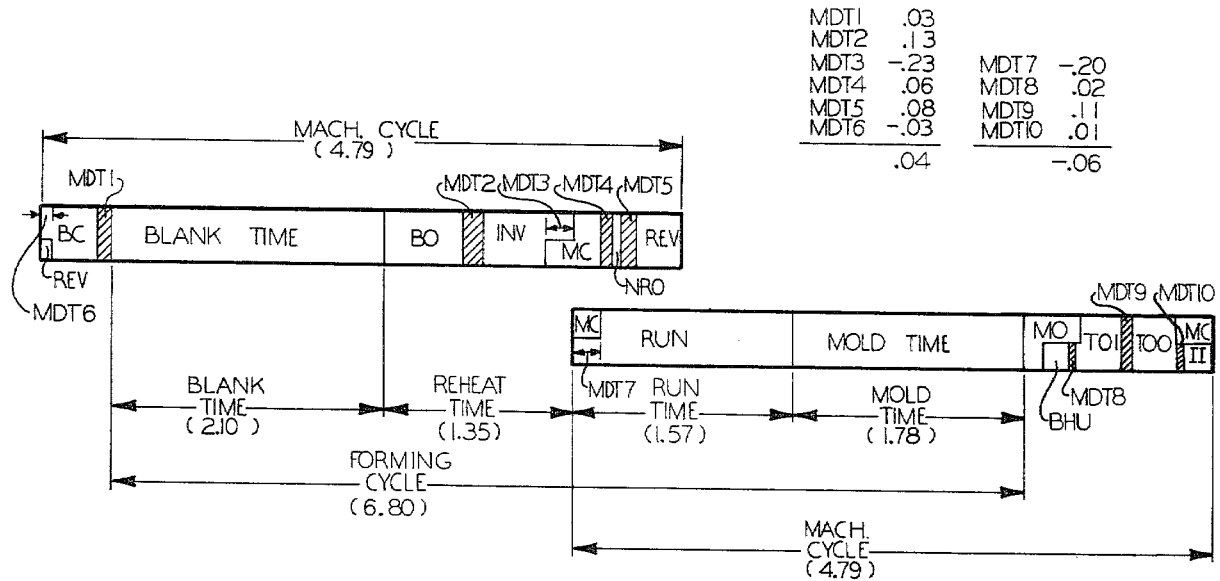

In order to increase the production rate of an IS machine, the machine cycle time must be reduced. The present invention functions to reduce the machine cycle time by identifying and, where possible, reducing any mechanical dead times associated with the forming operations. FIGS. 6A and 6B will be utilized to discuss the manner in which the present invention increases the production rate by reducing mechanical dead times.

Before discussing FIGS. 6A and 6B in detail, there are several important considerations which should be noted concerning the reduction of mechanical dead times. In some cases, it is not only possible to remove the dead times, but to actually overlap some of the functions. This results in the respective MDT having a negative value. For example, in the blank side operations shown in FIG. 6B, the revert (REV) and blank mold case (BC) functions overlap. The MDT between these functions, MDT6, has a negative value equal to the time period for which they overlap. In other cases, it is not practical or even possible to remove the dead times from the cycle. Furthermore, some MDT values will depend upon the position of the sensor. For example, the position of the gob sensor in relation to the opening of the blank mold will determine whether the value of MDT1 is positive, zero, or negative.

There are three strictly mechanical restraints upon removing mechanical dead time from the cycle. The first is that the blank side and mold side cycle times must both be equal to the machine cycle time. Thus, the maximum dead time which can be removed is equal to the lesser of the dead time in the blank side cycle and the mold side cycle. The second restraint is that the mold close functions in the blank side and mold side cycles must exactly coincide. The third restraint is that the takeout function must be completed before about two-thirds of the invert function is completed. This is required so that a collision between the parison being inverted and the bottle being taken out is avoided.

In addition to the strictly mechanical restraints, one must also determine what effect the elimination of MDT has upon the forming cycle and the time available for blank mold cooling. Any modification of the forming cycle will vary the amount of heat taken out of the parison and/or bottle which could result in the production of bottles which do not meet commercial specfications. Reduction in cooling time for molds and blanks will result in hotter molds and blanks. This too will effect the rate and amounts of heat extracted from the glass.

Referring to FIGS. 6A and 6B, there are shown those glassware forming operations which are necessary to clearly illustrate MDT1 through MDT10. Several of the glassware forming operations have been abbreviated in accordance with the abbreviations shown in FIG. 3. For example, the blank mold close operation is represented as BC. Also, specific timing data has been shown in FIGS. 6A and 6B in order to more accurately explain the operation of the present invention. It should be noted that the timing data and the individual glassware forming operations shown in FIGS. 6A and 6B are merely representative of a typical glassware forming method, and that the present invention is also applicable to methods having more or less glassware forming functions and/or mechanical dead times.

FIG. 6A is similar to FIG. 3 and illustrates a blank mold cycle and blow mold cycle before the removal of any mechanical dead time. In FIG. 6A, the machine cycle is 4.93 seconds long. The forming cycle, which includes blank time (2.10 seconds), reheat time (1.35 seconds), run time (1.57 seconds), and mold time (1.78 seconds) is 6.80 seconds long. Although it is not a requirement of the present invention, it is desirous to reduce those MTD's which do not affect the forming cycle for the glassware article. As previously discussed, any change in the forming cycle may adversely affect the quality of the finished article of glassware.

FIG. 6B illustrates a blank cycle and mold cycle in which the machine cycle time has been reduced by 0.14 second from the cycle time shown in FIG. 6A. This reduction in machine cycle time has been accomplished by reducing MDT1, MDT5 and MDT6 in the blank side and by reducing MDT8 and MDT10 in the mold side. Both the blank side and mold side have been reduced by the same amount. It is important to note that the machine cycle has been reduced, but that the forming cycle operation times have remained the same. Thus, the machine speed has been increased without affecting the characteristics of the finished glassware articles.

As previously mentioned, from a practical standpoint, it is not desirous to reduce certain MDT's to zero. For example, MDT1 represents the time delay between the closing of the blank mold and the arrival of the gob. Because there will always be some variance in the gob arrival time, MDT1 has been reduced to 0.03 second to accommodate this variance. As will be discussed, the computer can tabulate the gob arrival times and calculate a variance which defines the minimum value of MDT1.

Although certain MDT's are always maintained at a positive value, some MDT's can be reduced to negative values. For example, in FIG. 6B, MDT6 has been reduced to −0.03 second. A negative MDT occurs when two sequential forming functions overlap. In FIG. 6B, the blank mold will begin to close (BC) prior to the completion of the revert function (REV).

Figures 7A, 7B:
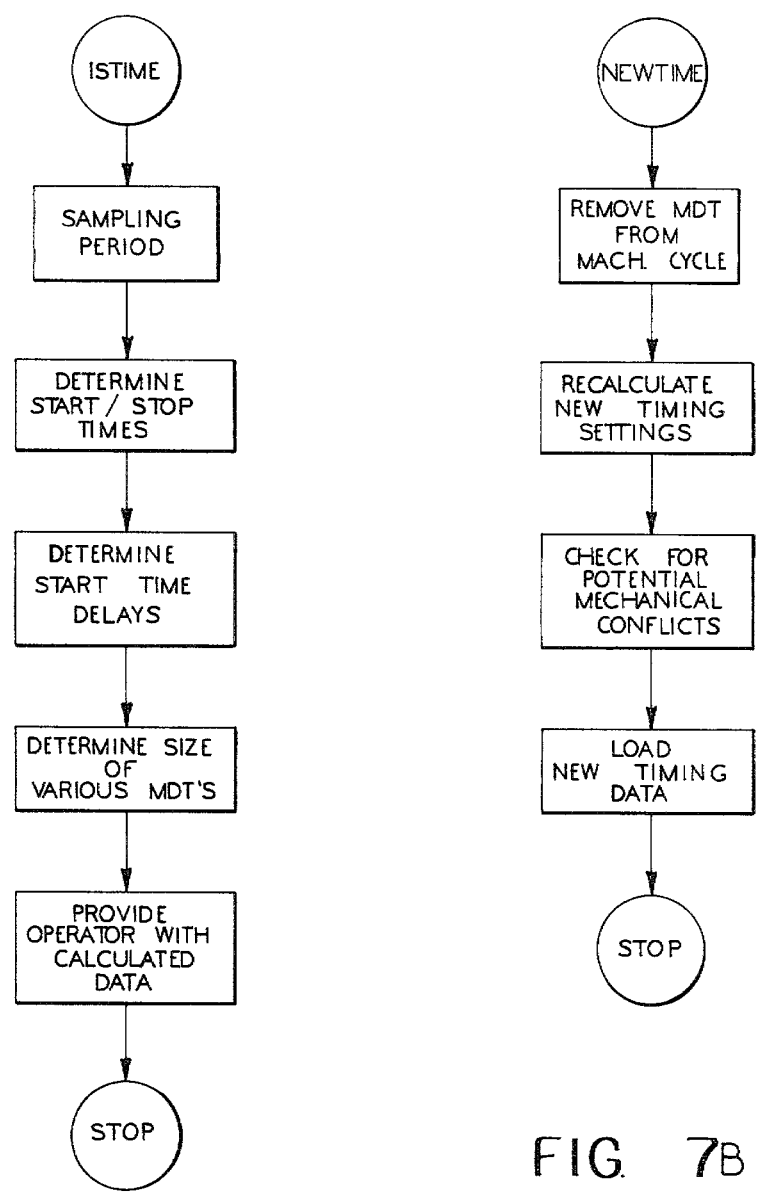
FIGS. 7A and 7B are simplified flow diagrams illustrating the operations of the individual section computers of FIG. 1 in identifying and reducing mechanical dead time in a machine cycle.

FIGS. 7A and 7B represent simplified flow diagrams of the operation of the individual section computers 13 and 14 and the machine supervisory computer 11 in identifying and removing or reducing the various MDT's in the machine cycle. The first program, ISTIME, shown in FIG. 7A, is utilized to identify and calculate the various MDT's and inform the machine operator of the MDT's. The second program, NEWTIME, shown in FIG. 7B, enables the operator to instruct the computer to reduce the machine cycle by reducing the MDT's.

In FIG. 7A, the program is initated at a circle "ISTIME" and enters a processing function "SAMPLING PERIOD." The computer 13 will then sequentially scan each channel of the multiplexer 68 and record the times at which the outputs of the respective position sensors 24 change states. Depending on the speed of computers 13 and 14 and the components of the interface circuit, it may take three or four machine cycles before a complete set of data has been obtained. A complete set of data includes the timing data which is shown in previously discussed FIG. 5.

Once the timing data has been obtained and stored, the program exits the processing function "SAMPLING PERIOD" and enters a processing function "DETERMINE START/STOP TIMES." During this function, the program utilizes the stored data to determine the start and stop times of the motions of each of the monitored mechanisms. Typically, the start/stop times are calculated relative to the gob load time, which is then considered zero time. Once the start/stop times of the mechanism motions have been determined, the program enters a processing function "DETERMINE START TIME DELAYS." Here, the computer 13 determines the delay between the time at which the control signals are generated to the valve block 17 and the actual start of motions of the respective forming mechanisms. These delays can be utilized to calculate a variance in the actual motion start time of each of the mechanisms which, in some cases, would limit the amount of dead time which could be removed.

After the time delays have been determined, the program enters a processing function "DETERMINE SIZE OF VARIOUS MDT'S." Here, the computer utilizes the previously determined start/stop times to identify and calculate the duration of any existing MDT's. After the MDT's have been determined, the computer enters a processing function "PROVIDE OPERATOR WITH CALCULATED DATA" wherein data calculated during the program is presented to the machine operator via a suitable input/output terminal (not shown). The "ISTIME" program is then completed, and the program enters the circle "STOP."

After the operator has examined the data, he can use the "NEWTIME" program of FIG. 7B to reduce computer selected MDT periods. The program is initiated at a circle "NEWTIME" and enters a processing function "REMOVE MDT FROM MACH. CYCLE." Here, the operator can instruct the computer to reduce selected MDT's by predetermined amounts. The program then enters a processing function "RECALCULATE NEW TIMING SETTINGS." During this function, the computer recalculates the new timing settings based on the desired MDT reduction. After the new timing data has been calculated, the computer enters the processing function "CHECK FOR POTENTIAL MECHANICAL CONFLICTS." The computer will then analyze the new timing settings to check if the operator has requested an MDT reduction which could possibly result in a mechanical conflict. If the computer determines that a conflict may exist, it can inform the operator of this condition so that the operator can take corrective steps. The program then enters a processing function "LOAD NEW TIMING DATA" wherein the newly calculated timing settings are loaded into the control program for actuating the forming mechanisms. The machine supervisory computer 11 then adjusts the timing pulse generator 12 to define the new machine speed. This completes the program.

The present invention provides a method and apparatus for increasing the speed and efficiency of an individual section glassware forming machine by reducing the mechanical dead time in the machine cycle. The present invention maintains the glassware forming cycle time such that the quality of the glassware is either not changed or improved. Machine speed increases of several percent can be achieved and the resulting good job setups can easily be transferred from machine to machine and plant to plant.

A good job setup can be transferred as actual times such as blank time, reheat time, etc., rather than on and off timing values for each operation in terms of degrees. The present invention would then utilize the mechanism delays and durations of movements specific to the section of the new machine to determine the on an off timing values required to produce the desired forming cycle. The present invention is also an aid to the machine operator in developing a good forming cycle. The operator can focus on selected elements of the forming cycle and make changes while relying upon the present invention to make the appropriate timing changes to all forming mechanisms to prevent collisions and change only the operator selected portion of the cycle.

Although the present invention has been discussed in terms of the glassware forming machine disclosed in U.S. Pat. No. 4,152,134, which includes a control having one computer per section and a machine supervisory computer, the present invention can be utilized with glassware forming machines having other types of controls including a single control for a multisection machine or a single control for a plurality of machines. Furthermore, not only can the present invention be utilized during job setup, but it can be utilized to make corrections to a good job setup when mechanical wear or another factor has caused an increase or decrease in the MDT's.

While the means for generating an indication representing the mechanical dead time between the operations of glassware forming means and for changing the timing of at least one of the control signals to reduce mechanical dead time have been represented in flow diagrams which set forth operations of the individual section computers in the illustrative embodiments of this invention, it is to be appreciated that hard wired logic elements can be combined to perform the functions set forth in the flow diagrams for either or both of the dead time determination and the dead time reduction.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In a glassware forming machine having glassware forming means for forming glassware articles from gobs of molten glass in a timed series of predetermined forming steps in response to a plurality of control signals, and control means for generating the control signals, the improvement comprising:
   a first sensor means for generating a first output signal representing the operation of one of the glassware forming means associated with one of the forming steps;
   a second sensor means for generating a second output signal representing the operation of another one of the glassware forming means associated with another one of the forming steps; and
   means responsive to said first and second output signals for generating an indication representing the mechanical dead time between the operations of said one glassware forming means and said another glassware forming means.

2. The glassware forming machine according to claim 1 wherein said first sensor means is located proximate said one glassware forming means and generates said first output signal representing a predetermined position of said one glassware forming means.

3. The glassware forming machine according to claim 2 wherein said predetermined position is an end of the operation of said one glassware forming means.

4. The glassware forming machine according to claim 1 wherein said second sensor means is located proximate said another glassware forming means and generates said second output signal representing a predetermined position of said another glassware forming means.

5. The glassware forming machine according to claim 4 wherein said predetermined position is an end of the operation of said another glassware forming means.

6. The glassware forming machine according to claim 1 wherein said first sensor means generates said first output signal representing a terminal position in the operation of said one glassware forming means, said second sensor means generates said second output signal representing an initial position in the operation of said another glassware forming means, and said means responsive to said first and second output signals generates an indication of the mechanical dead time between the termination of the operation of said one glassware forming means and the initiation of the operation of said another glassware forming means.

7. The glassware forming machine according to claim 1 wherein said another forming step succeeds said one forming step in the timed series of predetermined forming steps.

8. A method of controlling a glassware forming machine having glassware forming means of forming glassware articles from gobs of molten glass in a timed series of predetermined forming steps in response to a plurality of control signals, and control means for generating the control signals, comprising the steps of:
   a. generating a first output signal representing the operation of one of the glassware forming means associated with one of the forming steps;
   b. generating a second output signal representing the operation of another one of the glassware forming means associated with another one of the forming steps; and
   c. determining the mechanical dead time between the operations of said one glassware forming means and said another glassware forming means from said first and second output signals.

9. The method according to claim 8 wherein said step (a) is performed by sensing a predetermined position of said one glassware forming means and generating said first output signal representing said predetermined position of said one glassware forming means.

10. The method according to claim 8 wherein said step (b) is performed by sensing a predetermined position of said another glassware forming means and generating said second output signal representing said predetermined position of said another glassware forming means.

11. The method according to claim 8 wherein said step (a) is performed by sensing a terminal position in the operation of said one glassware forming means and generating said first output signal representing said terminal position.

12. The method according to claim 11 wherein said step (b) is performed by sensing an initial position in the operation of said another glassware forming means and generating said second output signal representing said initial position.

13. The method according to claim 12 wherein said step (c) is performed by determining the mechanical dead time as the time between the termination of the operation of said one glassware forming means and the initiation of the operation of said another glassware forming means from said first and second output signals.

14. The method according to claim 8 including a step (d) of changing the timing of at least one of the control signals to reduce the mechanical dead time determined in said step (c).

15. In a glassware forming machine having glassware forming means for forming glassware articles from gobs of molten glass in a timed, predetermined sequence of forming steps in response to a plurality of control signals, and control means for generating the control signals, means for changing the timing of the control signals comprising:
 a first sensor means for generating a first output signal representing the operation of one of the glassware forming means associated with one of the forming steps;
 a second sensor means for generating a second output signal representing the operation of another one of the glassware forming means associated with another one of the forming steps;
 means responsive to said first and second output signals for generating a signal representing at least a portion of the mechanical dead time between the operations of said one glassware forming means and said another glassware forming means; and
 means for changing the timing of at least one of the control signals to reduce the mechanical dead time.

16. The means for changing the timing of the control signals according to claim 15 wherein said first sensor means generates said first output signal representing a predetermined terminal position in the operation of said one glassware forming means and said second sensor means generates said second output signal representing a predetermined initial position in the operation of said another glassware forming means.

17. The means for changing the timing of the control signals according to claim 16 wherein said means responsive to said first and second output signals generates a signal representing the mechanical dead time between said predetermined terminal position in the operation of said one glassware forming means and said predetermined initial position in the operation of said another glassware forming means.

18. In a glassware forming machine having glassware forming means for forming glassware articles from gobs of molten glass in a timed, predetermined sequence of forming steps in response to a plurality of control signals, and control means for generating the control signals, the improvement comprising:
 a plurality of sensor means each generating an output signal representing a predetermined position in the operation of one of the glassware forming means associated with one of the forming steps; and
 means responsive to said output signals for generating an indication of the mechanical dead time between the operations of two of the glassware forming means associated with successive ones of the forming steps.

19. The improvement according to claim 18 wherein said means for generating an indication generates a signal representing the mechanical dead time between the operations of said two glassware forming means and including means for changing the timing of at least one of the control signals to reduce the indicated mechanical dead time.

20. The improvement according to claim 18 wherein a first plurality of the forming steps are associated with a blank side cycle of the glassware forming machine, a second plurality of the forming steps are associated with a mold side cycle of the glassware forming machine, and said means for generating an indication indicates a first mechanical dead time for said blank side cycle and a second mechanical dead time for said mold side cycle.

21. The improvement according to claim 20 wherein said means for generating an indication generates a first signal representing the mechanical dead time for said blank side cycle and a second signal representing the mechanical dead time for said mold side cycle; and including means for changing the timing of at least one of the control signals to reduce the mechanical dead time for said blank side cycle and said mold side cycle by the same amount.

* * * * *